A. GRUB.
TRACTOR SLED.
APPLICATION FILED MAR. 19, 1915.

1,178,582.

Patented Apr. 11, 1916.
2 SHEETS—SHEET 1.

A. GRUB.
TRACTOR SLED.
APPLICATION FILED MAR. 19, 1915.
1,178,582. Patented Apr. 11, 1916.
2 SHEETS—SHEET 2.
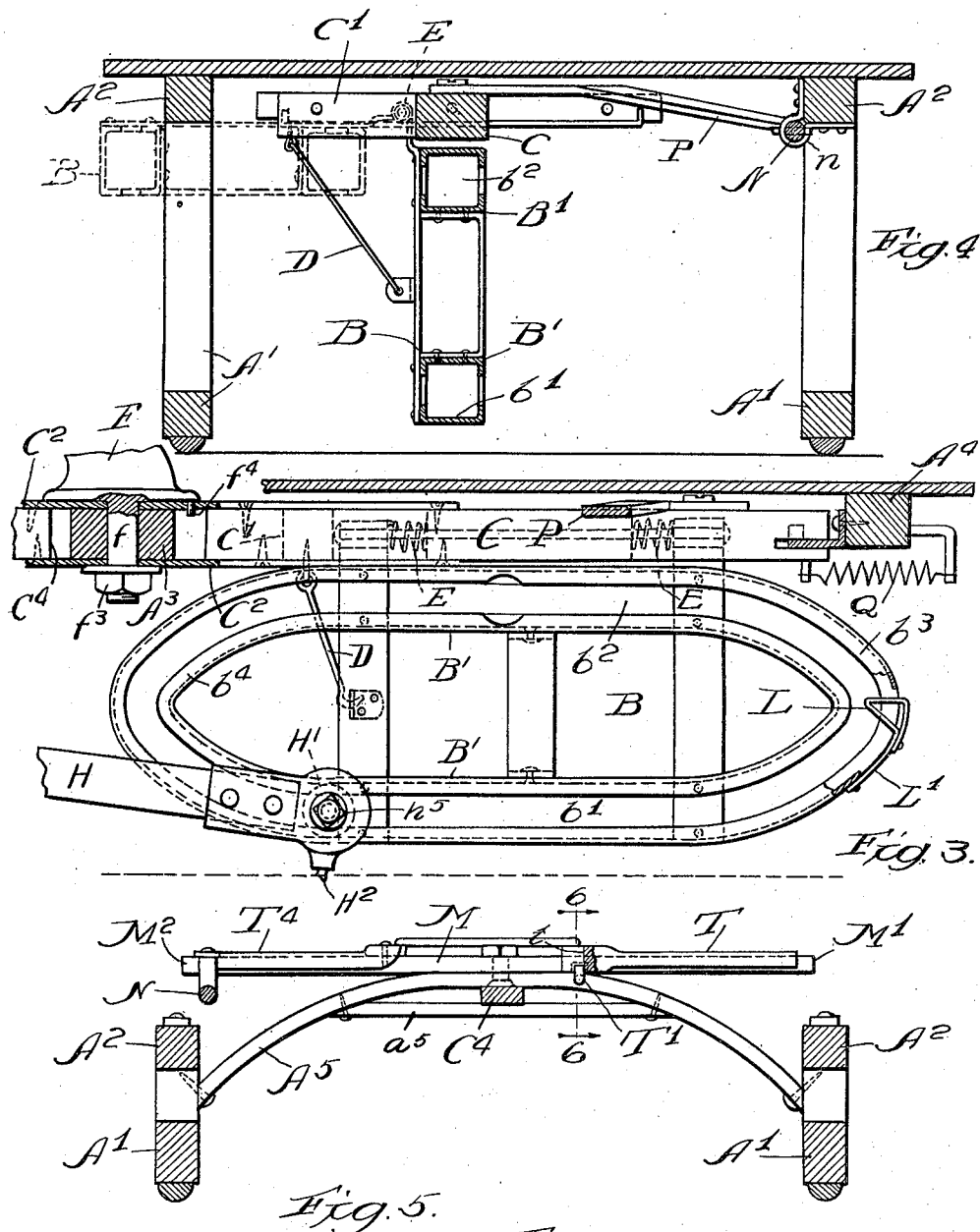

UNITED STATES PATENT OFFICE.

ALBERT GRUB, OF LYONS, ILLINOIS.

TRACTOR-SLED.

1,178,582.

Specification of Letters Patent.   Patented Apr. 11, 1916.

Application filed March 19, 1915.   Serial No. 15,433.

*To all whom it may concern:*

Be it known that I, ALBERT GRUB, a citizen of the United States, residing at Lyons, in the county of Cook and State of Illinois, have invented new and useful Improvements in Tractor-Sleds, of which the following is a specification, reference being had to the accompanying drawings, forming a part thereof.

The purpose of this invention is to provide an improved construction in a tractor sled, particularly with respect to means for steering by determining the direction of traction, but not limited to that feature.

It consists in the elements and features of construction shown and described as indicated in the claims.

Figure 1:
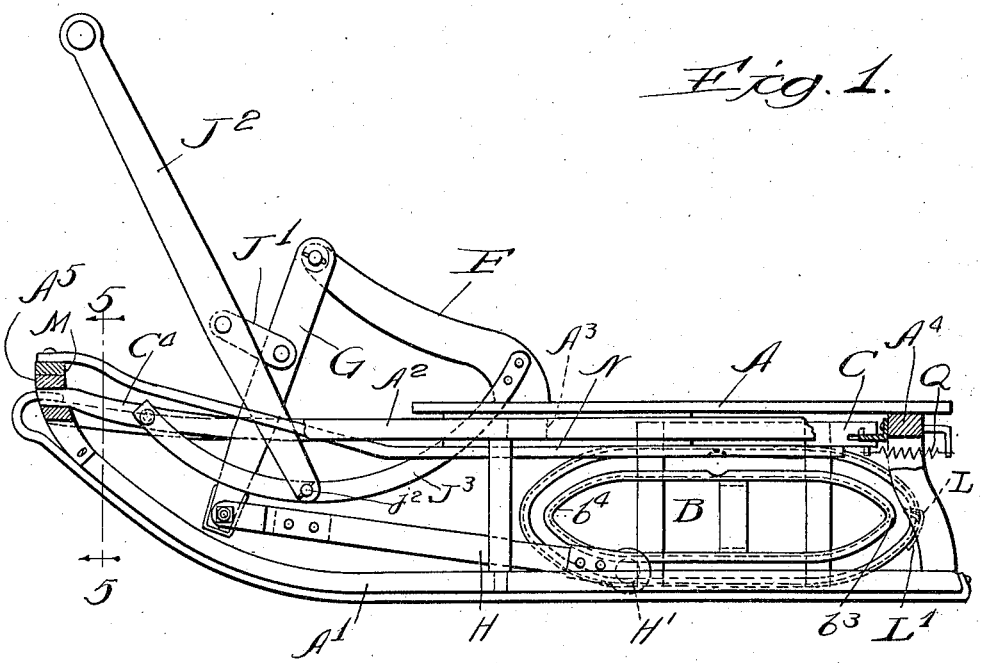
Figure 2:
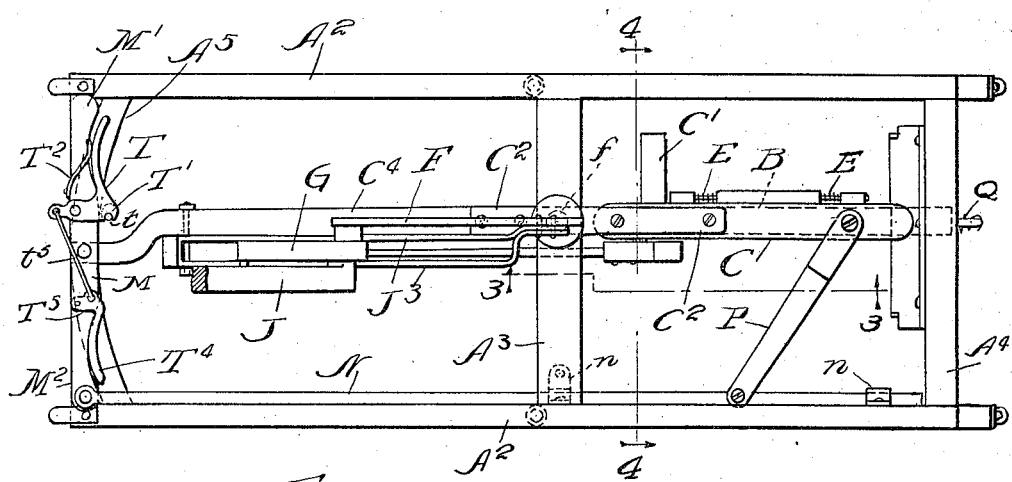

In the drawings:—Figure 1 is a side elevation of a sled embodying this invention, unimportant parts being broken away to disclose those more important with respect to the invention. Fig. 2 is a top plan view of the same. Fig. 3 is a section at the line 3—3 on Fig. 2. Fig. 4 is a transverse vertical section at the line 4—4 on Fig. 2, showing the tractor and operating lever connections removed and the tractor guide in full line in operative position, and in dotted line folded up out of operative position. Fig. 5 is a section at the line 5—5 on Fig. 1. Fig. 6 is a section at the line 6—6 on Fig. 5.

The elements constituting this invention are designed to be adapted for mounting upon a sled of ordinary construction comprising the platform indicated at A, the usual two side runners, $A^1$, $A^1$, and sled platform frame bars, $A^2$, $A^3$ and $A^4$, on which the traction devices are designed to be mounted. These traction devices comprise a tractor support and guide member, B, which is a longitudinally and vertically extending frame or skeleton having at one side a guide track, $B^1$, for receiving an engaging abutment of a tractor hereinafter described, and having for the purpose of guiding the tractor a lower longitudinal course, $b^1$, and an upper longitudinal course, $b^2$, which upper and lower courses are connected by curved portions, $b^3$, and $b^4$, at the opposite ends. This tractor guide and support, B, is mounted upon the platform frame by means of a bar, C, to which said tractor guide is preferably hinged for folding up out of its vertcial operative position to horizontal position lying under the sled platform, as shown in Fig. 4. For rendering it rigid in its operative position, brace arms, $C^1$, $C^1$, are extended off horizontally from the bar, C, and links or latches, D, D, are extended from the ends of said arms obliquely down to the tractor guide, to which they are disengageably connected by any convenient means. Preferably a spring, E, is provided reacting between the bar, C, and the tractor guide, B, to hold the latter at its horizontal or inoperative position when it is not forced down to its vertical operative position and locked in that position by the brace links mentioned. The bar, C, with the extension, $C^4$, thereof, hereinafter described, serves as the operating arm of the tractor guide and for that purpose the forward end of said bar, C, is pivotally connected to the intermediate one of the said platform frame bars, $A^3$, so as to be adapted to swing and oscillate the tractor guide transversely at the rear end to adjust the tractor within a limited range each way from a direct fore-and-aft position for determining the direction of the traction for the purpose of steering the sled while propelling it. The pivotal connection of this tractor guide operating arm, C, to the sled platform frame bar, $A^3$, at the forward end of the guide arm C, is effected by means of a pivotal terminal or pintle, $f$, of a standard, F, which extends up and forward for upholding the fulcrum support of the tractor-actuating lever, G, with operating connections hereinafter described. The standard, F, is made rigid with the bar, C, and with the entire tractor guide arm comprising the extension of said bar, C, hereinafter mentioned, and at the same time it is pivoted to the frame bar, $A^3$, by an expedient which also affords means for guiding and supporting the forward end of the tractor guide in its movements for steering. This expedient consists in bolting to the upper and lower sides of the bar, C, metal bars, $C^2$, $C^2$, between which, and at a short distance forward from the forward end of the bar, C, there is bolted the extension bar, $C^4$, of the tractor guide arm, the metal bars, $C^2$, $C^2$, clasping between them the sled frame bar, $A^3$. Then the pivot terminal or pintle, $f$, of the standard, F, extends through both the bars, $C^2$, $C^2$, and the intervening frame bar, $A^3$, said bars being retained by a nut, $f^3$, on the lower threaded end of said pintle $f$; and the standard, F, is made rigid with the combined or complete traction guide operating arm, C, C², C², C⁴, by having a lug, $f^4$, projecting eccentrically with respect to the pintle or pivot terminal, $f$, and engaging a hole in the upper of the metal bars, C². The forward end of the bar, C⁴, is lodged between the under side of the curved front runner brace, A⁵, and a segment bar, $a^5$, which extends across the upper segment of the curve of said brace for stiffening the latter and affording such lodgment for the bar, C⁴.

The tractor member, H, is a bar having an abutment or lateral projection, H¹, preferably in the form of a stud-and-roll, which engages the guide track of the tractor guide member, B. Said tractor bar has mounted on it near the end which has the stud-and-roll, H¹, a traction spur, H², which is preferably formed as a separate piece of metal so as to be made of proper material to be hardened for the service required of it, and which is preferably mounted adjustably in said tractor bar, being secured by a set screw, $h^5$.

For propulsion of the sled there is pivoted to the upper forward end of the standard, F, a lever, G, whose lower end is connected to the tractor bar, H; a link J¹, connects the lever, G, intermediate its fulcrum and its pivotal connection to the bar, H, with an operating lever, J², whose lower end is fulcrumed at, $j^2$, upon a guide member, J³, which is rigid with the standard, F, and tractor guide operating arm. This guide member is preferably formed as seen in Figs. 1 and 2 in the form of a curved loop made of a properly shaped bar folded upon itself to form such loop and having its ends bolted together upon the standard, F, near the base thereof, and the opposite or loop end bolted rigidly to the forward portion of the extension, C⁴, of the traction guide operating bar, C, said guide being curved substantially about the fulcrum of the lever, G, to the standard, F, so that said lever, G, swings in the loop between the two side bars of the guide.

The mode of operating the device for traction will be readily understood. It consists in swinging the upper end of the operating lever, J², back and forward, causing the tractor to reciprocate back and forward, its rearward propelling stroke being made by the operator pulling back on the handle end of the lever, J², with the abutment, H¹, following the lower course, $b^1$, of the tractor guide and support, B, and its forward idle stroke being made while said abutment is following the upper course, $b^2$, of said guide. For insuring the proper passage of the abutment from the lower to the upper course at the rear end of the tractor stroke, there is provided projecting into the curved portion, $b^3$, of said tractor guide track at a point substantially opposite the apex of the inner side of that curved portion of the track, a bluntly wedge-shaped tooth, L, which is formed as a part of or mounted upon a spring, L¹, riveted to the outer side of the guide track and projecting through an aperture in the outer wall of said track at the point indicated, in such position as to be encountered by the abutting stud-and-roll, H¹, as it rises around the rear curve, $b^3$, the encounter occurring at such position that the rearward thrust of the tractor, aided by the momentum which it will have at that time, will cause the abutment to crowd the tooth back while the roll of the abutment moves up in the track until the blunt point of the tooth presses against said roll at a point a little lower than the center of the roll, whereupon the reaction of the spring pressing the tooth forward will force it under the roll, thereby lifting the roll past the apex of the curve and putting it in position to be pulled back forward into the upper course, $b^2$.

For adjusting the tractor guide for steering there is mounted upon the sled frame at the forward part in convenient position to be reached by the feet of the occupant of the sled, and preferably as shown upon the front upwardly convex cross bar or runner brace, A⁵, a horizontal lever, M, fulcrumed at the middle point of its length and having the opposite ends in position to be reached by the two feet respectively of the occupant. One arm of this lever is connected with a bar, N, mounted for sliding fore-and-aft on the sled platform in guideways, $n, n$, provided thereon in any convenient manner. This bar extends back to a point opposite the rear end of the tractor guide, B, and is connected to that end of the tractor guide by a link, P, the connection being made directly with the rear end of the bar, C. The points of connection of the link, P, with the sliding bar, N, and the bar, C, respectively, and the length of the link for such connection are such that at the direct fore-and-aft position of the bar, C, the lever, M, is at its directly transverse position on the sled platform, said link, P, trending obliquely forward from its connection with the bar, C, to its connection with the sliding bar, N, so that upon the lever, M, being pushed forward at the right hand end, causing the left hand end to swing rearward and push the bar, N, rearward, the link, P, being moved to nearly direct transverse position, pushes the rear end of the bar, C, over to the right, causing the tractor guide to be adjusted to an oblique position at which it will cause the tractor to propel the sled to the left of a direct fore-and-aft course; and upon the foot lever, M, being pushed forward by the foot of the occupant at the left-hand end, pulling the bar, N, forward, the link, P, being thereby drawn to a position trending more obliquely forward from the bar, C, to the bar, N, pulls the rear end of the bar, C, over to the left, causing the sled to be steered to the right.

At any convenient point in the train of connections from the foot lever, M, to the bar, C, there may be provided a spring tending to hold the parts at the position for direct forward travel,—that is to say, with the tractor guide extending directly fore-and-aft. Such a spring is shown at Q, attached at its forward end to the rear end of the bar, C, and at its rear end to the sled platform at a point directly rearward from the point of its attachment to the bar, C, when the bar, C, is at direct fore-and-aft position. It will be seen that this spring will be stretched whichever way the bar, C, is moved from said direct fore-and-aft position, and will react for restoring the bar said direct fore-and-aft position.

It may be found desirable to have means for locking the parts so as to hold the tractor guide at its direct fore-and-aft position for straight running more securely than it would be held merely by the spring last mentioned, and for this purpose there is shown a latch device mounted in connection with the foot lever, M, adapted to be released when the operator presses either foot against the lever for swinging it to steer the sled to right or left. This latching device comprises a latch or hook, T, pivoted on the arm, M¹, of the lever, M, having a notch, t, which engages a pin, T¹, on the frame bar, A⁵, and a spring, T², tending to hold it so engaged, such engagement occurring when the lever, M, is at its direct transverse position, and holding the tractor guide in direct fore-and-aft position for straight-forward running. This latch is positioned so that the operator will press it with his foot when he intends to push the arm, M¹, of the lever, M, forward, and will release said latch by the first movement in that direction, the further movement operating the lever as desired. In order to release the latch when the lever is moved in the opposite direction by pressure of the foot upon the arm, M², of said lever, a lever, T⁵, is fulcrumed on the lever, M, and connected by a link, t⁵, with the latch, T, at the opposite side of the fulcrum of the latter from the pin, T¹, so as to pull the latch out of engagement with the pin when the long arm, T⁴, of the lever, T⁵, is swung forward. Said portion, T⁴ of the lever, T⁵, and the corresponding portion of the lever, T, are preferably folded down so as to extend behind the rear edge of the lever, M, so that one of said levers, T, or T⁵, receives the pressure of the operator's foot when he desires to push either arm of said lever, M, forward, and being thus encountered and pushed against the rear edge of the lever, M, releases the latch before the pressure of the operator's foot is received by said lever, M, for swinging the latter.

Many obvious modifications of the arrangement of the parts will occur to any mechanic upon considering the structure as illustrated and described, and I do not limit myself to the precise construction or arrangement either of the lever connections for operating the tractor or of the connections for swinging the tractor guide for steering, or of the devices for locking the tractor guide swinging devices at straight forward running position.

I claim:—

1. In combination with a sled, comprising a part depending between the runners, having an endless track consisting of an upper and a lower course and curved portions connecting them; a tractor member having a stud engaging the track and means for reciprocating said tractor member longitudinally of the sled runners; a spring-supported approximately wedge-shaped tooth protruding in one of said curved portions of the track substantially opposite the apex of the inner boundary of said track in position to be encountered by the stud and adapted by virtue of its spring support to yield out of the path of the stud and return thereinto behind the latter.

2. In combination with a sled, a propelling device comprising a tractor member mounted for reciprocation longitudinally of the sled runners and having a projection; a tractor support and guide having an endless guide track for said projection, adapted to cause the tractor to be lifted for movement in one longitudinal direction and dropped for its propelling movement in the opposite direction, said tractor guide being mounted for swinging horizontally from a position parallel to the sled runners to positions oblique thereto in either direction, and means for swinging said tractor guide at will during the operation of the tractor.

3. In combination with a sled, a propelling device comprising a tractor and a support for the same on which said tractor travels in one longitudinal direction in position for traction and in the opposite direction out of traction position, said tractor support being pivoted to the sled for swinging horizontally; a foot-operated lever fulcrumed on the sled for horizontal oscillation; a member mounted for fore-and-aft movement on the sled connected to one arm of said foot lever, and a link from said fore-and-aft moving member to one end of the swinging tractor support.

4. In combination with a sled, a propelling device comprising a tractor member, a tractor-supporting member on which the tractor travels in one longitudinal direction in position for traction and in the opposite direction out of traction position, said tractor-support being pivoted to the sled for swinging horizontally; a foot lever fulcrumed on the sled for horizontal oscillation, and connections from said lever to the swinging tractor support for swinging the latter; a spring-pressed latch device on said foot lever for locking it at position at which it holds the tractor guide in direct fore-and-aft position, said latch being exposed for pressure by the foot of the operator and positioned for unlatching by such pressure in the direction for moving the lever.

5. In combination with a sled, a propelling device comprising a tractor and a tractor-support on which the tractor travels in one longitudinal direction in position for traction, and in the opposite direction out of traction position; a foot lever fulcrumed on the sled for horizontal oscillation, and connections by which said lever swings the tractor support; a latching device on said lever adapted for securing the lever at the position for holding the tractor guide in direct fore-and-aft position, said latching device having a member positioned for contact of the operator's foot in operating the lever in either direction, adapted for releasing the latch by the lever operating movement.

6. In combination with a sled, a tractor and a tractor guide mounted thereon; a lever for actuating the tractor removably fulcrumed on the sled platform, the tractor being disengageable from the guide for removal with the lever, the tractor guide being hinged to the sled platform for folding up away from the ground when not in use, and means for locking and bracing it in operative position.

7. In combination with a sled, a tractor and a tractor guide mounted thereon; a bar by means of which the guide is mounted on the sled platform, said bar being pivoted to the sled for swinging horizontally to adjust the guide, the guide being hinged to the bar for folding up out of operative position to substantially horizontal position, brace arms extending horizontally from the bar and brace links extending from said arms obliquely down to the tractor guide for securing it in operative position.

8. In combination with a sled, a tractor and a tractor guide mounted thereon between the runners; a bar by which the tractor is so mounted; a pivotal member by which the bar is attached at one end to the sled platform for swinging horizontally to adjust the guide for controlling the direction of traction; a lever support mounted on said pivotal member for turning therewith; a lever fulcrumed on said lever support and connections from the lever for reciprocating the tractor.

In testimony whereof, I have hereunto set my hand at Chicago, Illinois, this 5th day of March, A. D., 1915.

ALBERT GRUB.

Witnesses:
ROBT. N. BURTON,
EDNA M. MACINTOSH.

Copies of this patent may be obtained for five cents each, by addressing the "Commissioner of Patents, Washington, D. C."